(12) United States Patent
Fabre et al.

(10) Patent No.: US 8,974,884 B2
(45) Date of Patent: Mar. 10, 2015

(54) PART COMPRISING A STRUCTURE AND A SHAPE MEMORY ALLOY ELEMENT

(75) Inventors: Adrien Fabre, Montrouge (FR); Pierrick Jean, Paris (FR); Jean-Pierre Lombard, Pamfou (FR)

(73) Assignee: SNECMA, Paris (FR)

( * ) Notice: Subject to any disclaimer, the term of this patent is extended or adjusted under 35 U.S.C. 154(b) by 344 days.

(21) Appl. No.: 13/497,134

(22) PCT Filed: Sep. 3, 2010

(86) PCT No.: PCT/FR2010/051840
§ 371 (c)(1),
(2), (4) Date: Mar. 20, 2012

(87) PCT Pub. No.: WO2011/033206
PCT Pub. Date: Mar. 24, 2011

(65) Prior Publication Data
US 2012/0183718 A1    Jul. 19, 2012

(30) Foreign Application Priority Data
Sep. 21, 2009    (FR) ...................................... 09 56469

(51) Int. Cl.
| | | |
|---|---|---|
| B32B 15/00 | (2006.01) | |
| B29C 65/00 | (2006.01) | |
| F01D 5/16 | (2006.01) | |
| F01D 5/26 | (2006.01) | |
| F04D 29/32 | (2006.01) | |
| F04D 29/66 | (2006.01) | |
| F16F 1/02 | (2006.01) | |

(52) U.S. Cl.
CPC .. *F01D 5/16* (2013.01); *F01D 5/26* (2013.01); *F04D 29/324* (2013.01); *F04D 29/668* (2013.01); *F16F 1/021* (2013.01); *F16F 2224/0258* (2013.01); *F05D 2260/96* (2013.01); *F05D 2300/505* (2013.01)
USPC ................................................ 428/67; 428/68

(58) Field of Classification Search
USPC ....................................................... 428/67, 68
See application file for complete search history.

(56) References Cited

U.S. PATENT DOCUMENTS

| | | |
|---|---|---|
| 2003/0156942 A1 | 8/2003 | Villhard |
| 2003/0194320 A1 | 10/2003 | Villhard |
| 2004/0051219 A1 | 3/2004 | Sherwin et al. |
| 2005/0207896 A1 | 9/2005 | Gigliotti, Jr. et al. |
| 2007/0175583 A1 * | 8/2007 | Mosallam .................. 156/307.1 |
| 2008/0075593 A1 | 3/2008 | Read et al. |

FOREIGN PATENT DOCUMENTS

| | | |
|---|---|---|
| EP | 1 577 422 | 9/2005 |
| GB | 2 438 185 | 11/2007 |

OTHER PUBLICATIONS

International Search Report issued on Dec. 29, 2010 in PCT/FR10/051840 filed on Sep. 3, 2010.

* cited by examiner

*Primary Examiner* — Brent O'Hern
(74) *Attorney, Agent, or Firm* — Oblon, McClelland, Maier & Neustadt, L.L.P.

(57) ABSTRACT

A part includes a structure and at least one shape memory alloy element that is prestressed and embedded at least in part within said structure. The shape memory alloy is suitable for dissipating the mechanical energy of said structure when it vibrates in a given frequency band.

11 Claims, 2 Drawing Sheets

PART COMPRISING A STRUCTURE AND A SHAPE MEMORY ALLOY ELEMENT

BACKGROUND OF THE INVENTION

1. Field of the Invention

The present invention relates to a part including a structure.

2. Description of the Related Art

In certain applications, a structure is subjected to aerodynamic stresses caused by the flow of a fluid, e.g. air, around said structure. This applies for a structure that is a part of an aviation turbine engine, e.g. a fan blade. These stresses can cause the structure to vibrate. Such a structure also possesses its own vibration modes associated with its mechanical properties (essentially its distributions of stiffness and mass). Unstable coupling can then become established between the vibration generated in the structure by the aerodynamic stress, and the vibratory characteristics of the structure, by feedback between the structure and the fluid that flows around it. This coupling phenomenon is known as "flutter". Whether or not flutter appears in a structure that is subjected to aerodynamic stresses depends on the balance of the sum of two energies: the aerodynamic energy $E_A$ and the mechanical dissipation energy of the structure $E_M$.

The aerodynamic energy $E_A$ is the energy transmitted by the fluid to the structure as a result of flowing around it.

The mechanical dissipation energy of the structure $E_M$ is the energy that is dissipated mechanically by the structure. This dissipation depends on the intrinsic mechanical properties of the structure. For a structure made of composite material, these mechanical properties depend on the nature of the materials making up the composite structure, and on the internal architecture of the structure, i.e. on the arrangement between the various materials that make it up. This arrangement may exist at one or more scales: mesoscopic (short/long fibers, particles), macroscopic (weaving, braiding, layers/plies).

There is a risk of flutter in the structure when $(-E_A) > E_M$.

Flutter is a phenomenon that is undesirable in a structure since it causes the structure to enter into resonant modes in which vibration amplitudes within the structure increase in uncontrolled manner, and that can lead to the structure being destroyed.

The present invention seeks to remedy that drawback.

BRIEF SUMMARY OF THE INVENTION

The invention seeks to propose a part comprising a structure, e.g. a composite structure, in which vibration levels are decreased for a wide variety of free stresses (flutter) or forced stresses of asynchronous, synchronous, or transient type.

This object is achieved by the fact that the part includes at least one shape memory alloy element that is prestressed and embedded at least in part within said structure, said shape memory alloy being suitable for dissipating the mechanical energy of said structure when it vibrates in a given frequency band.

By means of these arrangements, the shape memory alloy (SMA) element(s) confer(s) on the structure an internal function of damping the vibration to which the structure is subjected. This increases the mechanical dissipation energy $E_M$ of the structure, and thus decreases the risk of the structure fluttering.

The invention also provides a method of fabricating a composite material structure having a shape memory alloy element within it, the structure being made up of a plurality of substructures.

According to the invention, the method is characterized by the following steps:

providing a plurality of sub-structures;
applying prestress to said shape memory alloy element;
placing said at least one shape memory alloy element on one of said sub-structures;
covering said at least one shape memory alloy element at least in part by another one of said sub-structures;
fastening together said shape memory alloy element and said structure, said sub-structures being selected from a group comprising a laminate of unidirectional plies, a woven composite, a braided composite, a uniform material, a film type covering, and a layer-of-paint type covering; and
releasing said prestress.

BRIEF DESCRIPTION OF THE SEVERAL VIEWS OF THE DRAWINGS

The invention can be better understood and its advantages appear better on reading the following detailed description of an embodiment given by way of non-limiting example. The description refers to the accompanying drawings, in which.

DETAILED DESCRIPTION OF THE INVENTION

Figure 1:
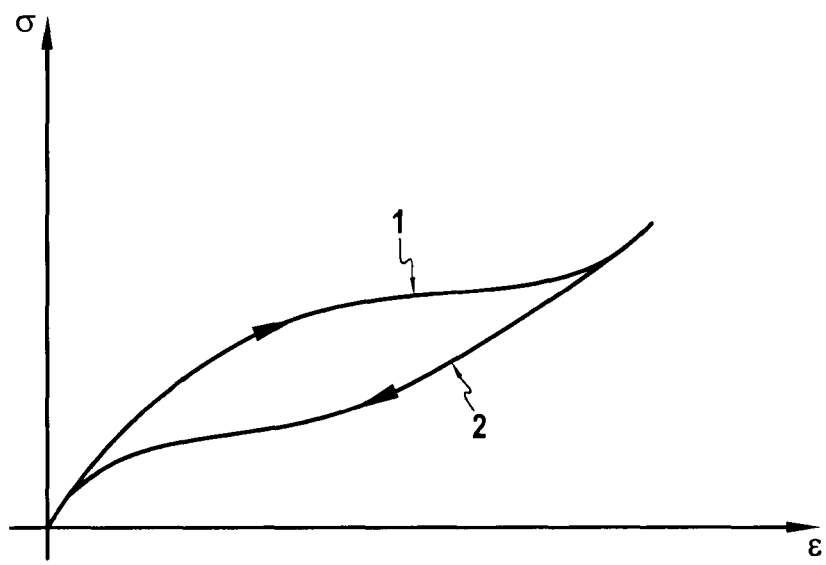
FIG. 1 shows the behavior of a shape memory alloy used in a structure of the invention.

Consideration is given to a structure that may be made of a composite material, or else of a uniform material, including of an alloy. The structure is nevertheless not itself made of a shape memory alloy.

In the present application, the term "composite material structure" is used to mean a structure made up of at least two materials having mechanical properties that are dissimilar.

For example, one of the materials is reinforcement and is embedded in the other material that constitutes a matrix. The arrangement between the reinforcement and the matrix may exist at one or more scales: mesoscopic (continuous fiber forming a unidirectional ply, or short fibers or particles in a matrix); or macroscopic (weaving or braiding fibers in a matrix, superposing layers made up of woven/braided fibers or plies).

The composite material structure may also be constituted by a core made of uniform material situated inside an envelope made of some other uniform material or of composite material. The core may be of a material that is less rigid than the material of the envelope, e.g. a core may be made of foam.

The composite material structure may also be a structure made up of two materials, one of the materials being a covering that covers the other material, at least in part. By way of example, the covering may be a film, which may serve to provide protection against erosion or against ultraviolet (UV)

radiation, or a paint, which may serve to provide protection against UV radiation. In particular, the covering may be constituted by a film, e.g. of polyurethane, formed on the pressure side face of the part, and a paint on the suction side face. The other material may be a uniform material or a composite material.

The invention is described below for circumstances in which the structure is a composite material structure.

When a composite material structure, in particular a structure of elongate shape, is placed in a fluid flow, e.g. a flow of air, the interaction between the flow and the structure may give rise to vibration within the part. For certain ranges of parameters, which parameters include the physical properties and the flow speed of the fluid, the mechanical properties of the materials making up the structure, and the internal structure of the structure (shape and arrangement of its various materials), it can happen that flutter becomes established in the part, i.e. a regime of undesirable vibration, as explained above. Such flutter can lead to damage and destruction of the structure.

In order to prevent flutter, the inventors insert within the structure at least one element made of shape memory alloy (SMA), in particular wires or sheets, which element is embedded at least in part inside the structure.

SMAs presents non-linear behavior under mechanical stress, with this being due to a reversible austenite/martensite phase change taking place within the crystal lattice of the SMA. Since this feature of SMAs is itself known, only the main principles are outlined below.

As shown in FIG. 1, the stress-strain curve $\sigma(\epsilon)$ for an SMA follows a certain path when stress $\sigma$ is applied (curve 1) and a different path when the stress is relaxed (curve 2). The structure returns to its initial shape (the strain $\epsilon$ is elastic), however the structure dissipates energy internally during this cycle of change (hysteresis effect). This energy is equal to the area that lies between curve 1 and curve 2.

Thus, when an SMA is subjected to repeated stresses, e.g. because of vibration, it dissipates energy by hysteresis on each stress cycle.

By inserting SMA elements in a structure, it is thus possible by dissipating energy in hysteresis to reduce undesirable vibration of the structure (which amounts to increasing the mechanical dissipation energy of the structure $E_M$), thereby reducing the risk of flutter in the structure.

The SMA elements are embedded, in full or in part, within the structure so that the deformation of the structure is transmitted to said elements, in order to ensure that the elements take up the stresses to which the structure is subjected and thus perform their damping role. Advantageously, there is good adhesion between the SMA elements and the zones of the structure with which these elements are in contact, so that the deformations of the structure are transmitted more effectively to the elements.

Figure 6:
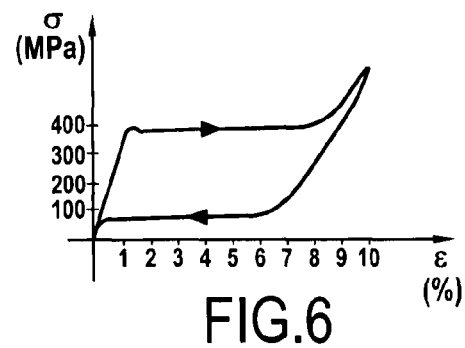
FIG. 6 shows one example of a behavior relationship for an SMA material with prestress.

The SMA elements are also prestressed, i.e. they are subjected to a certain level of stress on being inserted into the composite structure, with this applied stress being removed only after the elements have bonded to the surrounding structure, such that a certain amount of stress remains in the elements when the structure is at rest. The effect of this prestress is to shift the hysteresis cycle (see FIG. 1) of an SMA element to a range of stresses that is different from that of a non-prestressed element. FIG. 6 shows an example of a behavior relationship (stress-strain $\sigma(\epsilon)$) of an SMA material with prestress, showing the offset hysteresis cycle. The stress $\sigma$ is expressed in megapascals (MPa) (i.e. $10^6$ pascals), and the strain $\epsilon$ in %.

The prestress serves to maximize the damping function of the SMA elements so that these elements are active at the maximum stresses generated during flutter.

For example, the SMA element(s) may be prestressed in tension.

Thus, each point of the SMA element is subjected to tension stress, with this stress not necessarily being uniform within the SMA element.

By way of example, this prestress is applied mechanically by increasing the distance between two opposite ends of the SMA element. Thus, a first end of the element is held stationary, and the opposite other end is moved away from the first end. Alternatively, the two opposite ends of the element are moved apart. Under such circumstances, and when the embodiment is a wire, the ends are the longitudinal ends of the wire.

The prestress may also be applied thermally by heating the SMA temperature to a temperature higher than the temperature of the surrounding structure.

Under such circumstances, the heating of the SMA element (e.g. by placing it in an oven) causes the element to expand, and thus generates a tension prestress field in the element.

The element may also be heated by causing an electric current to flow along the element, with this flow giving rise to heating of the element by the Joule effect.

Depending on the architecture of the composite material structure within which the SMA element(s) is/are placed, depending on its shape, and depending on the places where insertion takes place, the method whereby the elements are inserted may vary.

When the structure is made up of a plurality of sub-structures, prestress is applied to the shape memory alloy element(s), the shape memory alloy element(s) is/are put into place on one of the sub-structures, the shape memory alloy element(s) is/are covered at least in part by another one of the sub-structures, the shape memory alloy element(s) and the structure are fastened together, and then the prestress is released.

The shape memory alloy element(s) are thus placed at the interface between the sub-structures.

Figure 2:
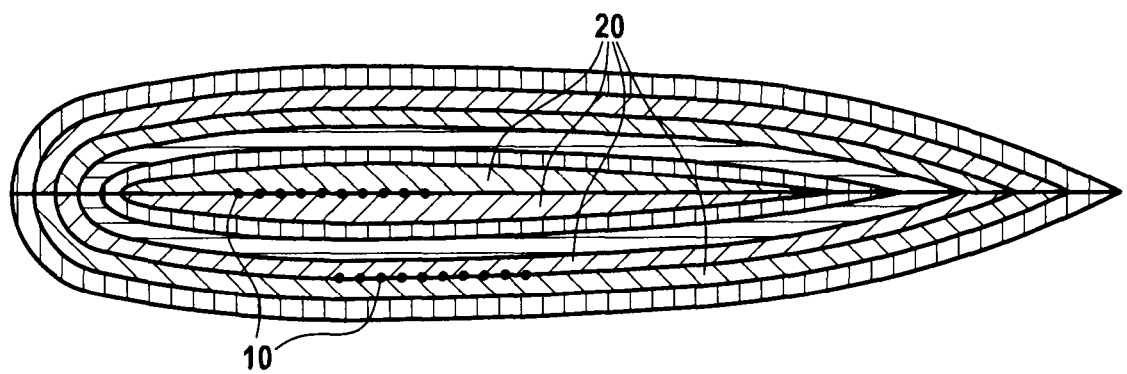
FIG. 2 is a diagrammatic section view of a part of the invention with a composite structure including plies.

Thus, when the composite material of the structure comprises a laminate of unidirectional plies, the SMA element(s) 10 may be placed between the plies 20, as shown in FIG. 2. Thus, after one of the plies has been put into place, one or more SMA elements are put into place on the ply, then the assembly is covered by another ply, which may be oriented in the same direction or in a different direction. These SMA elements may comprise one or more wires or a sheet. Thereafter the assembly is polymerized so as to form a solid block within which the SMA element(s) is/are embedded.

Figure 3A:
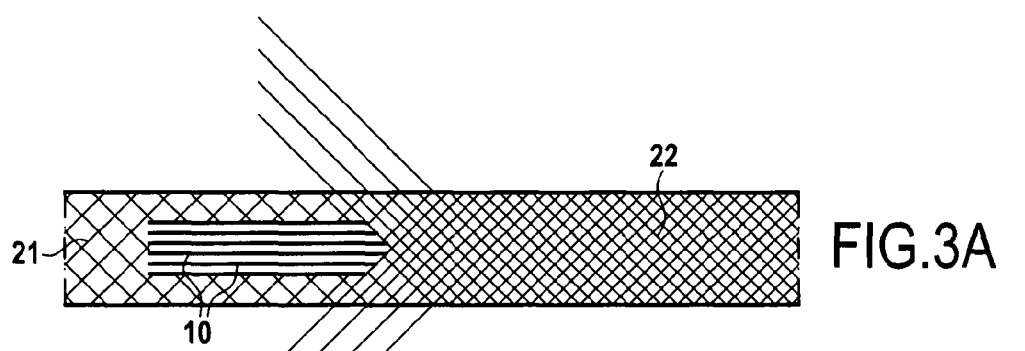
FIG. 3A is a diagram of a part of the invention with a composite structure including braided fibers.

As shown in FIG. 3A, one or more wires (and/or a sheet) of SMA 10 may be inserted between a first braid 21 made during a first pass of braiding the preform, and a second braid 22 made during a second braiding pass prior to densifying the preform (with densification being performed for example by infusion, injection, or chemical vapor infiltration).

In general, the sub-structures are selected from a group comprising a laminate of unidirectional plies, a woven composite, a braided composite, a uniform material, a film type covering, or a covering of the layer-of-paint type.

Thus, when the structure is made up of a sub-structure covered at least in part in a covering, the SMA element(s) may be placed on the sub-structure and covered, at least in part, by the covering, which may be a film, or a layer of paint.

When the composite material of the structure comprises a preform made by weaving or braiding fibers, the SMA element(s) may be inserted within the preform.

Figure 3B:
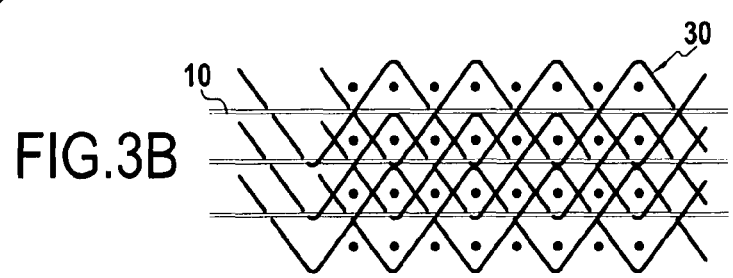
FIG. 3B is a diagram showing a part of the invention with a composite structure including woven fibers.

As shown in FIG. 3B, one or more SMA wires 10 may be prestressed and then inserted directly into the woven three-dimensional (3D) preform 30 before the preform and the SMA wires are densified. The preform may also be a two-dimensional (2D) woven preform.

The preform is then densified. The prestress is released after densification.

Alternatively, the preform may be made directly with woven or braided fibers including at least one that is a shape memory alloy wire that has previously been prestressed. The preform as made in this way is then densified, after which the prestress is released.

Figure 4:
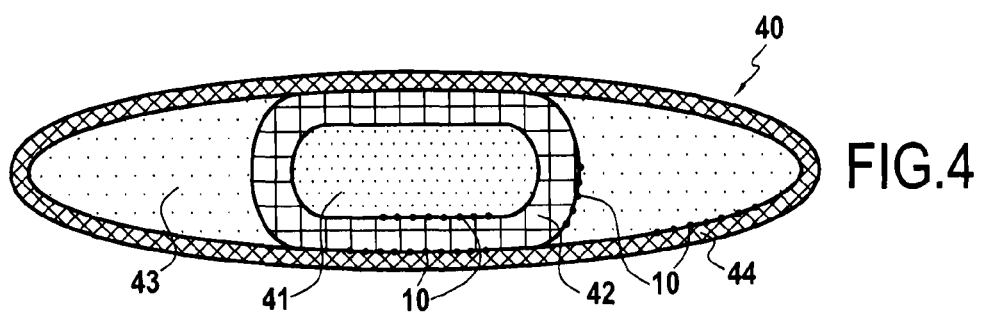
FIG. 4 is a diagrammatic section view of a part of the invention with a structure comprising a plurality of composite sub-structures.

FIG. 4 shows a situation in which the SMA wires 10 are placed within a propeller blade 40 at the interface between the strut 42 of composite material and a foam core 41, at the interface between the envelope 44 of composite material and a foam body 43, and at the interface between the envelope 44 of composite material and the strut 42 of composite material.

The composite structure in which the SMA element(s) is/are inserted may be a part for an aviation turbine engine. For example, the part may be a moving blade or a vane for a fan, a moving blade or a vane for a compressor or for a low pressure (LP) turbine, or for a high pressure (HP) turbine. The part may also be a propeller blade or a turbine engine casing.

SMA elements may be placed in a plurality of zones within the structure.

Figure 5:
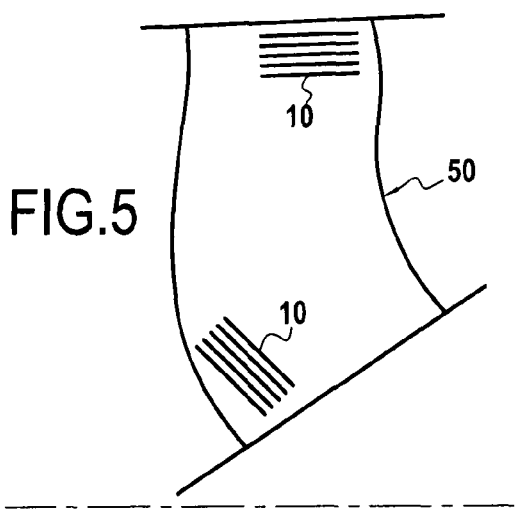
FIG. 5 shows a fan blade of the invention in which the SMA wires are oriented and positioned in its zones of maximum deformation.

Advantageously, the SMA element(s) is/are placed in one or more zones in which the composite structure is subjected to high levels of deformation, with the element(s) being oriented in the direction of maximum deformation. These zones are densified beforehand in known manner by modeling, e.g. using finite elements, or by testing. Thus, the vibration-damping effectiveness of the SMA elements is optimized. FIG. 5 shows a fan blade 50 in which SMA wires 10 (shown as if the blade were transparent) are oriented and positioned in the zones of maximum deformation within the structure, and by way of example in particular:

near the root of the blade, parallel to its leading edge; and
near the tip of the blade parallel to the end face of the blade tip.

The SMA elements may also be sheets, with the damping effect of the SMA elements then taking place in any direction within the plane of the sheet.

While being embedded in the composite structure, the SMA elements may be situated close to the surface of the structure. Such a position maximizes the deformation of the SMA elements.

The composite materials used in the composite structure may for example be organic matrix composites, or high temperature composites (e.g. composite having a ceramic or a metal matrix). Ideally, the SMAs are selected as a function of the operating temperature of the composite structure, such that the operating temperature lies within the temperature range in which the hysteresis effect (FIG. 1) occurs, which temperature range is specific to the SMA in question.

The SMAs used in the composite structure may for example be alloys of Ni—Ti, or Ni—Ti—Hf, or Ni—Ti—Pd, or Ti—Au—Cu, or Hf—Pd, or Ru—Nb, or Ru—Ta.

The invention claimed is:

1. A part for an aviation turbine engine, comprising:
a structure and at least one shape memory alloy element that is prestressed and embedded at least in part within said structure, said shape memory alloy being suitable for dissipating mechanical energy of said structure when said structure vibrates in a given frequency band,
wherein said structure is made up of a plurality of sub-structures, said at least one shape memory alloy element being placed in at least one of interfaces between said sub-structures.

2. The part according to claim 1, wherein said element is prestressed in tension.

3. The part according to claim 1, wherein shape memory alloy elements are placed in a plurality of zones of said structure.

4. The part according to claim 1, wherein said structure comprises at least one composite material.

5. The part according to claim 4, wherein said at least one composite material comprises a laminate of unidirectional plies, said at least one shape memory alloy element being placed between said plies.

6. The part according to claim 4, wherein said at least one composite material comprises a fiber preform, said at least one shape memory alloy element being placed within said preform.

7. The part according to claim 1, wherein said sub-structures are selected from a laminate of unidirectional plies, a woven composite, a braided composite, a uniform material, a film type covering, and a layer-of-paint covering.

8. The part according to claim 1, wherein said at least one shape memory alloy element is selected from a wire and a sheet.

9. The part according to claim 1, wherein the part is a moving blade, a vane, a propeller blade, or a turbine engine casing of the aviation turbine engine.

10. The part according to claim 9, wherein the part is a moving blade, and the shape memory alloy element is provided near a root of the moving blade and parallel to a leading edge of the moving blade.

11. The part according to claim 9, wherein the part is a moving blade, and the shape memory alloy element is provided near a tip of the moving blade and parallel to an end face of the tip of the moving blade.

* * * * *